United States Patent [19]

Epstein et al.

[11] Patent Number: 4,722,609

[45] Date of Patent: Feb. 2, 1988

[54] HIGH FREQUENCY RESPONSE MULTILAYER HEAT FLUX GAUGE CONFIGURATION

[75] Inventors: Alan H. Epstein, Lexington; Gerald R. Guenette, Jr., Salem, both of Mass.; Robert J. G. Norton, Marietta, Ga.

[73] Assignee: The United States of America as represented by the Secretary of the Navy, Washington, D.C.

[21] Appl. No.: 738,217

[22] Filed: May 28, 1985

[51] Int. Cl.$^4$ .................. G01K 17/00; H01C 7/02
[52] U.S. Cl. ............................ 374/30; 338/25; 250/252.1; 374/185
[58] Field of Search .............. 374/29, 144, 183, 43; 338/25, 35; 250/252.1

[56] References Cited

U.S. PATENT DOCUMENTS

| | | | |
|---|---|---|---|
| 2,334,969 | 11/1943 | Thut | 356/216 |
| 2,740,899 | 4/1956 | Cummings | 250/252.1 X |
| 3,188,594 | 6/1965 | Koller et al. | 374/185 |
| 3,605,490 | 9/1971 | Progelhof et al. | 374/29 |
| 3,887,785 | 6/1975 | Ahlport | 338/25 X |
| 3,939,706 | 2/1976 | Pinson | 374/32 |
| 4,129,848 | 12/1978 | Frank et al. | 374/185 X |
| 4,364,398 | 12/1982 | Sassi et al. | 374/129 |
| 4,375,056 | 2/1983 | Baxter et al. | 338/25 |
| 4,456,919 | 6/1984 | Tomita et al. | 136/225 X |
| 4,545,690 | 10/1985 | Zysman et al. | 436/147 X |
| 4,577,976 | 3/1986 | Hayashi et al. | 374/30 X |

OTHER PUBLICATIONS

"Steady-State Heat Flux Gauge", E. A. Brown et al, Review of Scientific Instruments, vol. 32, #8, Aug. 1961, pp. 984-985.

"A Turbulent Heat Flux Meter, . . . Measurements in . . . Airflow Through A Heated Pipe", P. J. Bourke et al, Int. J. Heat Mass Transfer, vol. 13, pp. 1331-1338, G. Britain.

Primary Examiner—Daniel M. Yasich
Attorney, Agent, or Firm—Arthur A. McGill; Prithvi C. Lall; Michael J. McGowan

[57] ABSTRACT

Double-sided, high-frequency response heat flux gauge for use on metal turbine blading consists of a metal film (1500A) resistance thermometer sputtered on both sides of a thin (25 μm) polyimide sheet. The temperature difference across the polyimide is a direct measure of the heat flux at low frequencies, while a quasi-1D analysis is used to infer the high-frequency heat flux from the upper surface history.

6 Claims, 16 Drawing Figures

HIGH FREQUENCY RESPONSE MULTILAYER HEAT FLUX GAUGE CONFIGURATION

STATEMENT OF GOVENMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention generally relates to instrumentation. More particularly it comprises thin film resistance temperature sensors for measuring heat flux to a surface at frequencies ranging from DC to over one hundred kilohertz.

(2) Description of the Prior Art

Accurate measurement of the heat transfer rate to turbine blading has long been recognized as a key to the improvement of high pressure turbine stages. The development of heat flux instrumentation for hot, warm and cold machines has therefore been an active research area. In hot turbines the harsh, oxidizing environment is a severely limiting constraint. Here thermal gradient devices such as Gardon gauges are becoming increasingly practical for measurement of the time average heat flux level.

The development of short duration turbine test facilities (30 to 700 ms test times) over the past decade has stimulated the development of heat flux instrumentation specifically optimized for the relatively benign environment (500°–800° K. gas temperatures) typical of these facilities. Calorimeter and thin film semi-infinite instruments have been extensively used in these applications.

SUMMARY OF THE INVENTION

The object of the invention was the development of a heat transfer gauge technology which would permit simultaneous measurement of both the steady state and time resolved heat flux distribution about the rotor blades in the MIT Blowdown Turbine facility. The specific requirements for this instrumentation are: that it be compatible with the rig environment (500° K. gas temperature, 290° K. metal temperature, 200 KW/m² leading edge heat flux levels); that it be capable of withstanding the high centrifugal stresses inherent to the rotor environment; that it have frequency response extending from DC to 5 to 10 times blade passing frequency: that it be usable in relatively large numbers per airfoil (10–20 per spanwise station); that it require minimal modification to the blading; and that it introduce the minimum disruption to, or interference with, the flow field and heat transfer.

The system described herein resulted from double-sided, high frequency response heat flux gauge technology developed specifically for use on metal turbine blading in short duration turbine test facilities. The gauge configurations comprise a metal film (1500 A) resistance temperature sensors sputtered on both sides of a thin (25 μm) polymide sheet. This sheet, containing 25 gauge configurations, is then adhesively bonded to and completely covers the airfoil surface. The temperature difference across the polyimide is a direct measure of the heat flux at low frequencies, while a quasi-1D analysis is used to infer the high frequency heat flux from the upper surface temperature history.

DESCRIPTION OF THE PREFERRED EMBODIMENT

Four candidate techniques were considered in some detail; calorimeter, blade temperature conduction models, thin film semi-infinite, and multilayer thin film gauges. All four techniques have been demonstrated, at least in stationary measurements, and are probably realizable in the rotating frame.

Figure 1:
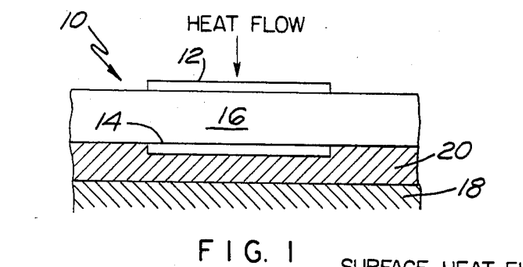
FIG. 1 is a schematic cross-section of a multilayer heat flux gauge affixed to a blade surface.

The technique selected was that of the multilayer thin film gauges. Referring now to FIG. 1 there is shown a single multilayer heat flux gauge configuration that is comprised of two temperature sensors 12 and 14 bonded on either side of a thin insulating substrate 16. A plurality of the gauge configuration 10 are affixed to a blade surface 18 by means of any suitable adhesive 20. The configuration 10 provides a thermal shunt. The temperature difference across the insulating substrate 16 is a direct measure of the heat flux to the blade surface 18 below a certain frequency. This is due to the direct proportionality between the temperature difference as measured by sensors 12 and 14, and the heat flux being valid only below this certain frequency. This frequency, however, increases as the insulating substrate 16 thickness is reduced. Conversely, above another frequency, the substrate 16 appears semi-infinite to the upper sensor 12 and a quasi-one-dimensional assumption can be used to infer the heat flux. In fact, the multilayer gauge configuration 10 could be considered an elaboration of the semi-infinite gauge in which a second sensor is placed within the substrate to eliminate the gauge performance dependence on the blade material properties. Alternatively, the gauge configurations 10 can be viewed as developments of the commercially available thermopile sensor, low frequency response gauges with the low response sensors replaced by high response resistance temperature sensors 12 and 14. For the selection of 25 μm thick polyimide insulator for substrate 16, the direct response (shunt) mode frequency response is DC to 20 Hz, while the semi-infinite assumption is good above 1.5 kHz. In the MIT Blowdown Turbine tunnel for which these gauge configurations 10 were designed, rotor blade passing frequency is 6 kHz. As later explained, the response in the intermediate 20–1500 Hz region can be reconstructed through proper numerical signal processing.

The multilayer gauge configurations 10 are fabricated many to a sheet of polyimide insulating material 16, tested, and then glued to the blade or test article surface 18 using standard strain gauge adhesive bonding techniques. The blade 18 is completely covered by the polyimide sheet material 16. The specific advantages of this heat flux gauge technology include: frequency response from DC to tens of kilohertz, conventional metal blading may be used, no thermal or geometric discontinuities are introduced, and the gauges 10 are fabricated and tested independently to the airfoil.

This disclosure details the theory, fabrication, testing and data reduction of these high frequency response multilayer heat flux gauge configurations 10.

The construction of a generic multilayer, time dependent, conduction model of the double sided heat flux gauge configuration 10 to use in the gauge design and calibration, and as a guide to its proper application is now explained. A cross-section of a mounted gauge configuration 10 is illustrated in FIG. 1. When mounted on a blade profile 18 or test item, the gauge configuration 10 becomes part of a five-layered structure consisting of the top thin film thermometer temperature sensor 12, the gauge insulating substrate 16, a second film temperature sensor 14, an adhesive layer 20, and finally the test article 18 itself. In general, the thermal properties of each layer will differ and thus, to be fully rigorous, a five-layer model might be employed. In practice, however, the film thermometer sensors 12 and 14 are sufficiently thin to appear thermally transparent to the applied heat flux, thereby permitting use of a three-layer model. Also, the sensors 12 and 14 will be excited at power dissipation levels sufficiently low that their influence as sheet sources of heat can be neglected. The quantitative conditions required to meet these criteria will be derived later.

Figures 2, 6A, 6B, 6C:
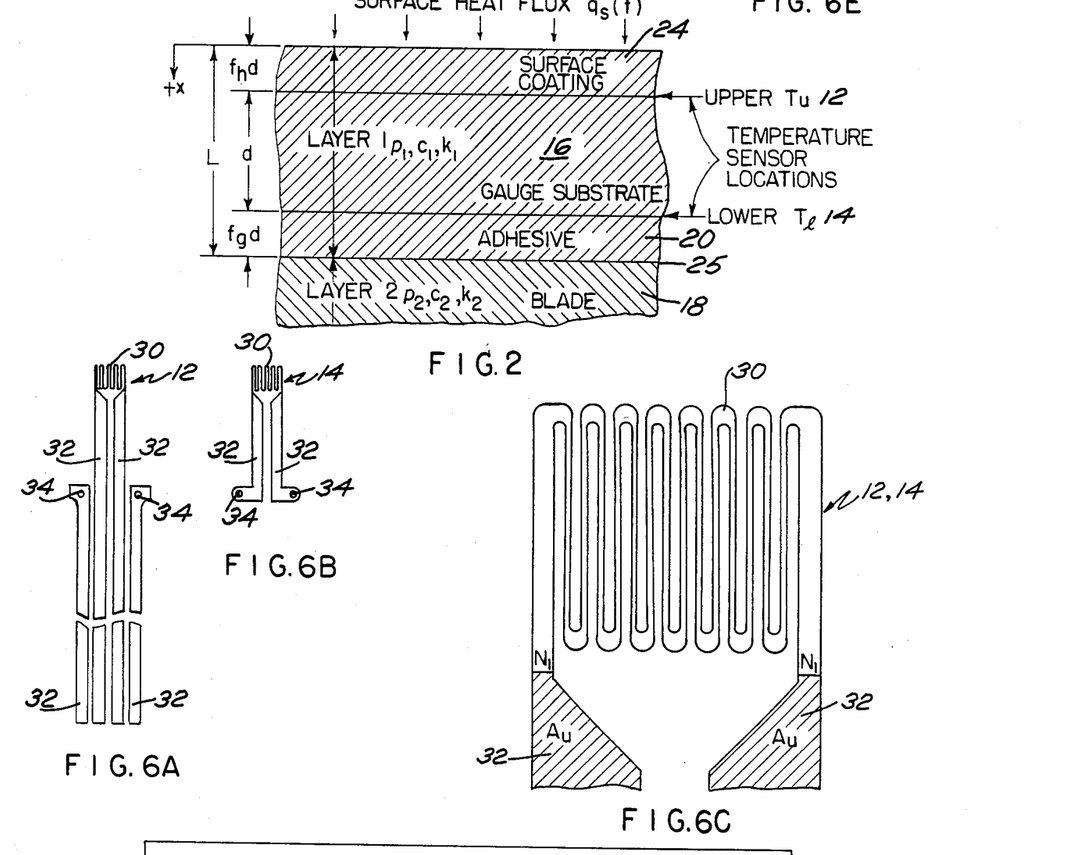
FIG. 2 shows the geometry of gauge and blade surface of FIG. 1 in an analytical model.
FIGS. 6a–e show the gauge geometry including sensor detail, sensor and leads of a polyimide substrate.

The model can be further simplified to two layers, as shown in FIG. 2 if we assume that the sensor substrate 16 and adhesive 20 have similar thermal properties and that the sensors are embedded in the upper layer $1\rho_1$, $c_1$, $k_1$. In detail, this adhesive thickness will represent not the exact physical thickness but an equivalent thickness including effects of unevenness and property variations. A similar assumption will be made about any surface coating 24 (protective or dirt) which may be on top of the gauge configuration 10 surface. The adhesive 20, substrate 16 and surface coating 24 will therefore form upper layer $1\rho_1$, $c_1$, $k_1$ of the model and the test article or blade 18 will form lower layer $2\rho_2$, $c_2$, $k_2$. Layer $1\rho_1$, $c_1$, $k_1$ is subsequently referred to as layer 1 and layer $2\rho_2$, $c_2$, $k_2$ is subsequently referred to as layer 2. The upper sensor $T_u$ 12 will lie under a surface layer 24 of thickness $h = f_h d$ and the lower sensor $T_l$ 14 will lie a distance $g = f_g d$, representing the glue layer 20, above the interface 25, where d represents the separation of sensors 12 and 14 and $f_g$, $f_h$ represent the glue 20 and surface 24 coating fractions respectively. Thus $x_u = f_h d$ and $x_l = (1 + f_h)d$, and if L is the thickness of upper layer 1, then $(1 + f_h + f_g)d = L$.

The heat conduction equations will be solved for the temperature distribution in a two layered semi-infinite medium of unlimited lateral extent subject to a spatially uniform surface heat flux, q(t). The flow of heat may therefore be considered to be one-dimensional. It is further assumed that the thermal properties within each layer 1 and 2 are uniform and that the layers 1 and 2 make perfect thermal contact. Thus, the temperature in each layer 1 and 2 is governed by, $$\text{Layer 1:} \frac{\partial T_1}{\partial t} = \kappa_1 \frac{\partial^2 T_1}{\partial x^2} \quad 0 \leq x \leq L \qquad \text{Eq. (1)}$$

$$\text{Layer 2:} \frac{\partial T_2}{\partial t} = \kappa_2 \frac{\partial^2 T_2}{\partial x^2} \quad L \leq x \leq \infty \qquad \text{Eq. (2)}$$

(where $\kappa = k/\rho c$ is the thermal diffusivity and k=thermal conductivity, $\rho$=density and c=specific heat, subject to the interface conditions, $$T_1(L,t) = T_2(L,t) \qquad \text{Eq. (3)}$$

$$k_1 \frac{\partial T_1}{\partial x}\bigg|_{x=L} = k_2 \frac{\partial T_2}{\partial x}\bigg|_{x=L} \quad -\infty < t < +\infty \qquad \text{Eq. (4)}$$

and the semi-infinite condition, $$T_2(\infty,t) = 0. \qquad \text{Eq. (5)}$$

To fully specify the problem, upper surface boundary conditions and inital conditions must be provided and these will depend upon the form of the driving surface heat flux to be investigated. We will consider two cases: (1) a steady sinusoid and (2) a step in surface heat flux. The solution to these problems employs standard techniques. The results are given in a form useful to the subsequent analysis and only the solution for the temperature in the layer containing the sensor, $T_1(x,t)$, will be reported.

In response to a steady harmonic variation in surface heat flux the initial conditions cannot be specified since the steady solution valid for all time is being sought. for the surface heat flux, $$\dot{q}_s(t) = -k_1 \frac{\partial T_1}{\partial x}\bigg|_{x=0} = Q_o \exp\{j\omega t\} \quad -\infty < t < +\infty \qquad \text{Eq. (6)}$$

the temperature distribution in Layer 1 is, $$T_1(x,t) = (Q_o d/k_1) M \exp\{j(\omega t - \phi)\} \quad 0 \leq x \leq L \qquad \text{Eq. (7)}$$

where, $$M = \sqrt{2} \left(\frac{\omega}{\omega_c}\right)^{-\frac{1}{2}} \exp\left\{-\frac{1}{2}\left(\frac{\omega}{\omega_c}\right)^{\frac{1}{2}} \frac{x}{d}\right\} \left(\frac{A^2 + B^2}{C^2 + D^2}\right)^{\frac{1}{2}} \qquad \text{Eq. (8)}$$

$$\phi = \frac{1}{2}\left(\frac{\omega}{\omega_c}\right)^{\frac{1}{2}} \frac{x}{d} + \frac{\pi}{4} - \tan^{-1}\left(\frac{BC - AD}{AC + BD}\right) \qquad \text{Eq. (9)}$$

A sensor characteristic frequency $\omega_c$ has been introduced based upon the sensor spacing d.

$$\omega_c = \frac{\kappa_1}{2d^2}. \qquad \text{Eq. (10)}$$

The other quantities are defined as follows:

$$A \equiv 1 - R \exp\left\{-\left[\frac{\omega}{\omega_c}\right]^{\frac{1}{2}}\left[\frac{L-x}{d}\right]\right\} \cos\left\{\left[\frac{\omega}{\omega_c}\right]^{\frac{1}{2}}\left[\frac{L-x}{d}\right]\right\} \qquad \text{Eq. (11a)}$$

$$B \equiv R \exp\left\{-\left[\frac{\omega}{\omega_c}\right]^{\frac{1}{2}}\left[\frac{L-x}{d}\right]\right\} \sin\left\{\left[\frac{\omega}{\omega_c}\right]^{\frac{1}{2}}\left[\frac{L-x}{d}\right]\right\} \qquad \text{Eq. (11b)}$$

$$C \equiv 1 + R \exp\left\{-\left[\frac{\omega}{\omega_c}\right]^{\frac{1}{2}}\left[\frac{L}{d}\right]\right\} \cos\left\{\left[\frac{\omega}{\omega_c}\right]^{\frac{1}{2}}\left[\frac{L}{d}\right]\right\} \qquad \text{Eq. (11c)}$$

$$D \equiv -R \exp\left\{-\left[\frac{\omega}{\omega_c}\right]^{\frac{1}{2}}\left[\frac{L}{d}\right]\right\} \sin\left\{\left[\frac{\omega}{\omega_c}\right]^{\frac{1}{2}}\left[\frac{L}{d}\right]\right\} \qquad \text{Eq. (11d)}$$

$$R \equiv \frac{r-1}{r+1} \qquad \text{Eq. (12)}$$

$$r \equiv \frac{\sqrt{(\rho c \kappa)_2}}{\sqrt{(\rho c \kappa)_1}}. \qquad \text{Eq. (13)}$$

In response to a step in surface heat flux both the transient and steady solution to the problem are of interest. The initial conditions are, $$-\infty < t < 0 \begin{cases} T_1(x,t) = 0 & 0 \leq x \leq L \\ T_2(x,t) = 0 & L \leq x < \infty \end{cases} \qquad \text{Eq. (14)}$$

For the surface heat flux, $$q_s(t) = -k_1 \frac{\partial T_1}{\partial x}\bigg|_{x=0} = \begin{cases} 0 & -\infty < t < 0 \\ Q_o & 0 \leq t < +\infty \end{cases} \qquad \text{Eq. (15)}$$

the temperature distribution in Layer 1 is given by, $$T_1(x,t) = (Q_o d/k_1)\sqrt{\frac{t}{\tau}} \sum_{n=0}^{\infty} (-R)^n (\text{ierfc } P_n - R \text{ ierfc } Q_n) \qquad \text{Eq. (16)}$$

where $$P_n \equiv \frac{(x/d)}{\sqrt{t/\tau}} + 2n \frac{(L/d)}{\sqrt{t/\tau}} \qquad \text{Eq. (17a)}$$

$$Q_n \equiv -\frac{(x/d)}{\sqrt{t/\tau}} + 2(n+1) \frac{(L/d)}{\sqrt{t/\tau}} \qquad \text{Eq. (17b)}$$

and ierfc( ) is the first integral of the complementary error function. A gauge time constant $\gamma$ has been introduced, again based upon gauge thermal diffusivity and sensor spacing.

$$\tau = d^2/4\kappa. \qquad \text{Eq. (18)}$$

The temperature is referenced to the quantity $(Q_o d/k_1)$ which represents the steady state temperature drop required to "drive" a heat flux $Q_o$ across the distance d.

The characteristic frequency $\omega_c$ and the time constant $\gamma$ are defined with respect to the gauge film spacing d and not the layer thickness L. Thus, the expressions for the solution may appear a little more cumbersome than necessary to describe the temperature distribution but they are in the proper form for the subsequent analyses of the gauge response characteristics.

In discussion of the gauge model the solutions for the temperature in Layer 1, $T_1(x,t)$, depend intrinsically upon the properties of the gauge through $\sqrt{\rho c k}$ and k/d. These parameters form the basis for the normalization of the independent variables through the definitions of $\gamma$ and $\omega_c$. We will adopt these as the fundamental parameters which characterize the gauge and which, therefore, must be known to interpret its output. Additional influence comes from the thickness fractions of the surface coating and adhesive ($f_h$ and $f_g$ respectively) and the $\sqrt{\rho c k}$ of Layer 2 which enters through the parameter R.

The gauge model is now used to show that only the film thermometer scale factor, $\sqrt{\rho c k}$ and k/d need calibration. Variations in adhesive thickness and test article properties ($f_h$, $f_g$, R), although they influence the temperature levels, do not significantly affect the heat flux level inferred.

For gauge model response there is used the limiting case solutions of the low frequency direct mode and the high frequency semi-infinite mode. This provides a framework for gauge design and calibration.

In the direct or shunt mode, the surface heat flux is assumed to be proportional to the measured temperature drop across the gauge configuration 10. While this is valid for static measurements, a uniform temperature gradient will not exist across the gauge configuration 10 if there are frequency components for which the thermal penetration depth is comparable to, or smaller than, the gauge configuration 10 thickness. The gauge configuration 10 is considered to be in the semi-infinite mode for those frequency components which are effetively damped by the gauge substrate 16. In this case, the heat flux may be obtained entirely from the upper film thermometer $T_u$, 12. It should be understood that 'direct' and 'semi-infinite' are terms used to describe limiting processes within the gauge substrate 16 and are in no way exclusive of each other in actual operation of the gauge configuration 10.

For steady harmonic excitation in the direct measurement mode, the upper and lower film temperatures are provided by Eq. (7), $$T_u = T_1(x_u,t) = (Q_o d/k_1) M_u e^{j(\omega t - \phi_u)} \quad \text{Eq. (19a)}$$

$$T_l = T_1(x_l,t) = (Q_o d/k_1) M_l e^{j(\omega t - \phi_l)} \quad \text{Eq. (19b)}$$

where $M_u = M(x_u)$, etc.: $x_u = f_h d$ and $x_l = (l + f_h)d$ are the positions of the upper and lower temperature sensors 12 and 14; and $L = (l + f_H + f_g)d$ is the total thickness of Layer 1. The direct mode heat flux $\dot{q}_D$ indicated by an 'ideal' gauge, (i.e., error-free measurements of $T_u$ and $T_l$, and perfect knowledge of $k_1/d$), is $$\dot{q}_D(t) = (k_1/d)(T_u - T_l) \quad \text{Eq. (20)}$$

Substituting for the temperatures using Eqs. (19), the ratio of the measured to actual heat flux is, $$\frac{\dot{q}_D(t)}{\dot{q}_S(t)} = M_u e^{-j\phi_u} - M_l e^{-j\phi_l} \quad \text{Eq. (21)}$$

This may be put into the more useful magnitude-phase form, $$\frac{\dot{q}_D(t)}{\dot{q}_S(t)} = M_D e^{-j\phi_D} \quad \text{Eq. (22)}$$

where $$M_D = \{M_u^2 + M_l^2 - 2M_u M_l \cos(\phi_u - \phi_l)\}^{\frac{1}{2}} \quad \text{Eq. (22)}$$

$$\phi_D = \tan^{-1}\{[M_u \sin \phi_u - M_l \sin \phi_l]/[M_u \cos \phi_u - M_l \cos \phi_l]\} \quad \text{Eq. (23)}$$

represent the magnitude $M_D$ and the phase $\phi_D$ response for direct mode.

Figure 3A:
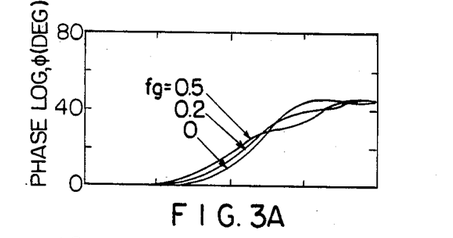
FIGS. 3a and 3b show the harmonic frequency response of the gauge normalized to the direct or shunt mode cutoff frequency, $\omega_c$ as a function of fractional glue thickness.
Figure 3B:
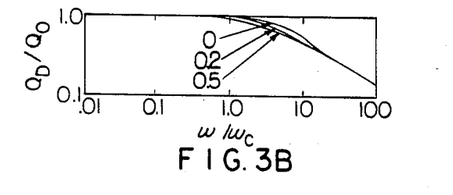

These are plotted in FIG. 3 as a function of the normalized frequency $\omega/\omega_c$, for several values of glue fraction, $f_g$. The case shown is for a polyimide substrate mounted upon an aluminum test body, R=0.96. The results show that the direct temperature difference mode is valid, in this example, for frequencies up to the cutoff frequency $\omega_c$, and that in this region the adhesive layer has negligible influence upon the performance of the gauge. Parametric studies show similar conclusions for the influence of R and $f_h$.

The results thus far show that, in the direct mode, the temperature rise per unit of surface heat flux can be approximated by, $$\frac{\Delta T}{Q} = \frac{d}{k} \quad \text{Eq. (25)}$$

up to the cutoff frequency, $$\omega_c = \frac{\kappa}{2d^2} = \frac{1}{2}\left(\frac{k/d}{\sqrt{\rho c k}}\right)^2 \quad \text{Eq. (26)}$$

If k/d is eliminated from these expressions, a constraint between gauge sensitivity $\Delta T/Q$ and the response bandwidth $f_c$ (in Hz) is obtained, $$\frac{\Delta T}{Q} f_c^{\frac{1}{2}} = \frac{1}{2\sqrt{\pi}} \frac{1}{\sqrt{\rho c k}} \quad \text{Eq. (27)}$$

i.e., the overall trade between signal strength and cutoff frequency depends only on the thermal $\sqrt{\rho c k}$ of the gauge substrate. Thus, both low thermal inertia $\rho c$ (more precisely high diffusivity), good for high $f_c$, and low thermal conductivity, good for high $\Delta T/Q$, are desirable.

The solution for steady harmonic excitation, Eq. (19b), shows that the response of the lower sensor is fully damped for frequencies above approximately 100 $\omega_c$. In the case of the semi-infinite mode, the expression for the surface temperature, Eq. (19a) (for x=0) reduces to $$T_u(t) = \frac{Q_o}{\sqrt{\rho c k}} \omega^{-\frac{1}{2}} e^{j(\omega t - \frac{\pi}{4})} \quad \text{Eq. (28)}$$

Thus, the condition for maximum high frequency temperature sensitivity is the same as for the direct measurement mode, low $\sqrt{\rho c k}$, except now it is seen that sensitivity also diminishes with frequency, as $\omega^{-\frac{1}{2}}$. This means that, for a fixed temperature measurement capability, low values of $\sqrt{\rho c k}$ will help to improve the upper frequency response limit of the semi-infinite mode.

In summary, this steady sinusoidal theory provides the basis for the gauge design, i.e., substrate and thickness selection. Low $\sqrt{\rho c k}$ is desirable for a high sensitivity-bandwidth product in direct measurement mode and for high sensitivity and frequency response in the semi-infinite mode. For a given $\sqrt{\rho c k}$, the trade between $f_c$ and $\Delta T/Q$ is then set by the choice of substrate thickness, d.

Figure 4:
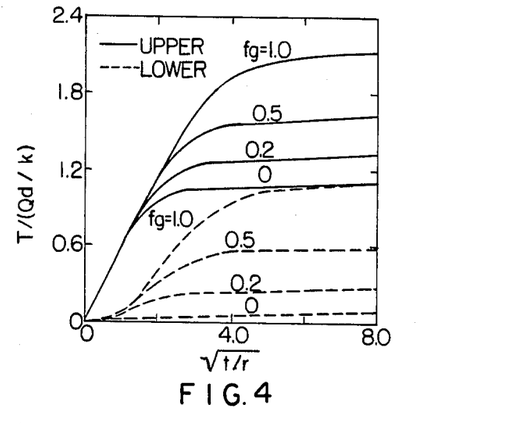
FIG. 4 shows the semi-infinite mode normalized time response of upper and lower sensors to a step in heat flux as a function of fractional glue thickness.

Now a look is taken at the semi-infinite mode step response, which is shown for the upper and lower thermometers in FIG. 4. The region in which the response of the upper thermometer is linearly proportional to $\sqrt{t}$ is that for which the semi-infinite assumption is valid. Here, the solution for x=0 is, $$T_u(t) = \frac{2Q}{\sqrt{\pi} \sqrt{\rho c k}} t^{\frac{1}{2}} \quad \text{Eq. (29)}$$

This equation is used for $\sqrt{\rho c k}$ calibration procedures discussed later. Note that, although increasing the adhesive fraction tends to extend the duration of the semi-infinite regime, it does not influence the performance of the gauge while in that regime. similar conclusions follow for R and $f_h$.

Figure 5:
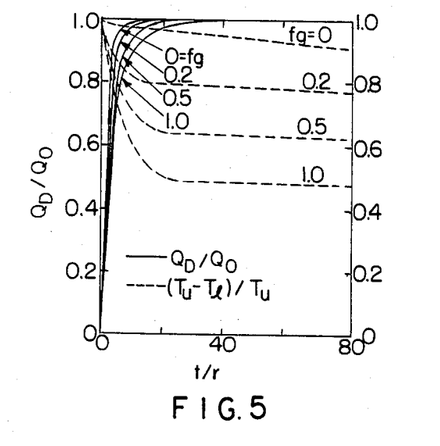
FIG. 5 shows the direct mode normalized response to a step input of heat flux as a function of fractional glue thickness.
Figure 6D:
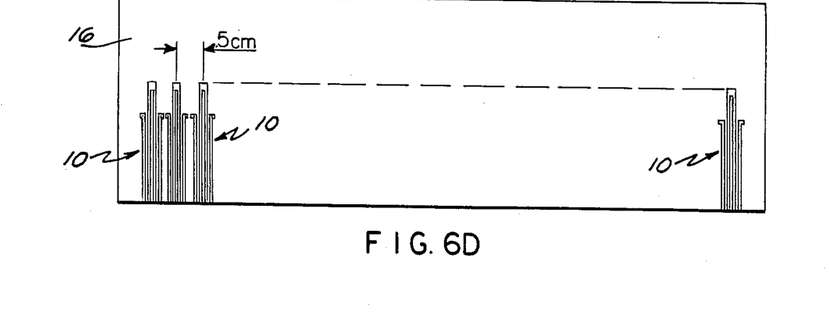
Figure 6E:
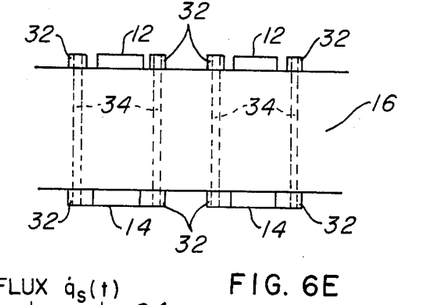

The step response for the direct difference mode is obtained from Eqs. (16) and (20) (FIG. 5). The effect of the glue layer is more evident from its influence upon the rise time of the measured response than it was from its effect upon the frequency response. Also, shown is a discriminant $t_u - T_l/T_u$, which can be used to estimate the effective thickness of the adhesive from test data.

These results clearly show the behavior of the semi-infinite ($t \leq \rho$) and steady state ($t > 20\tau$) limits. The actual data is reduced with the numerical technique which reconstructs the entire frequency domain, as will be described later.

This section discusses the design of thin film resistance thermometers used as temperature sensors 12 and 14 in the multilayer heat flux gauge configuration 10. These sensors 12 and 14 are nothing more than metal film resistors whose resistance changes with temperature. For a change $\delta T$ about a temperature T, the increment in film resistance may be expressed by a Taylor series expansion in power of $\delta T$, $$\delta R = R(T + \delta T) - R(T) = R(T)\alpha(T)\delta(T) + \quad \text{Eq. (30)}$$

higher order terms in $\delta T$.

The temperature coefficient of resistivity $\alpha(T)$, a fundamental material property, represents the fractional change in resistance about a given temperature, $$\alpha(T) = d(\ln R)/dT. \quad \text{Eq. (31)}$$

For the metals commonly employed in resistance thermometers, $\alpha(T)$ is usually a very weak function of temperature over ranges of practical interest. Thus, in many applications, a convenient form of Eq. (30) may be obtained by assuming constant $\alpha$ and neglecting the higher order terms, $$\Delta R = R\alpha \delta T. \quad \text{Eq. (32)}$$

(For the sensor here, this results in errors of order 0.1C over a 60C range.)

For a sensor excited at constant current, the change in voltage across the sensor, $\delta V$, is $$\delta V = (V\alpha)\delta T, \quad \text{Eq. (33)}$$

where V represents the total voltage drop across the film. Thus the sensitivity of the sensor is directly proportional to both its temperature coefficient and the excitation voltage. The excitation voltage is constrained, however, by the $V^2/R$ heat dissipation in the the film sensor, $$Q_E = V^2/(Rlw), \quad \text{Eq. (34)}$$

(where l and w are the active length and width of the film). This heat dissipation must be kept small compared to the heat flux being measured.

To quantify this constraint, film resistance will be expressed in terms of film geometry and volume resistivity, $$R = (\rho l)/(wt), \quad \text{Eq. (35)}$$

where t is the film thickness. Substituting into Eq. (34) yields $$V = (\rho/t)^{\frac{1}{2}} l Q_E^{\frac{1}{2}}. \quad \text{Eq. (36)}$$

This expression sets the excitation voltage. Note that this result is independent of the width of the film. The level of $Q_E$ can be adjusted for each measurement application. The film parameters ($\rho/t$, l, w, t), however, must be selected beforehand by the design process. Substitution of Eq. (36) into Eq. (33) yields a form of the sensitivity equation useful for design, $$\delta V/\delta T = (\rho/t)^{\frac{1}{2}} \alpha l Q_E^{\frac{1}{2}}. \quad \text{Eq. (37)}$$

This expression implies that long, thin films with high volume resistivity and temperature coefficient are best for high temperature measurement sensitivity. There are, however, many other conditions which must be considered to arrive at an overall optimum design of film resistance sensors for heat transfer gauges, some of which are discussed below.

The first two factors in Eq. (37), $(\rho/t)^{\frac{1}{2}}$, show the influence of film thickness and electrical properties on film sensitivity. Candidate film materials must also be raked based upon the sensitivity parameter $\alpha\sqrt{\rho}$, derived using the bulk properties of the materials. Note, however, that these properties are a function of film thickness in the region below 1 $\mu$m where data is available for only a few substances. Available tables do provide some general guidance for maximizing temperature sensitivity, the final choice being also influenced by:

(a) surface temperature changes resulting from the thermal resistance and capacity of the film, (b) abrasion resistance and substrate adhesion of the film, (c) residual stresses induced by the deposition process, and (d) changes in $\rho$ and $\alpha$ from their known bulk property values.

The third factor in Eq. (37) shows the influence of sensor surface geometry. The maximum length of the sensor, hence its sensitivity, will be determined by the spatial resolution requirements of the heat flux measurement. If this is characterized by a single length scale $\lambda$, for example, the film will be constrained to lie in a roughly square region, $\lambda$ on a side. Since the sensitivity has been shown to be independent of film width, a serpentine pattern can be employed to significantly increase the film sensitivity, if the minimum width that can be reliably deposited is much smaller than $\lambda$. For the film geometry chosen, $l \approx 14\lambda$. There are, however, several potential disadvantages to those thin, long and narrow film sensors. First, they are more vulnerable to small scale nicks and scratches. Second, they may prove unsuitable for calibration of substrate physical properties by the electrical self-heating method, which requires that the film width be much larger than the thermal penetration depth over the required calibration time. Third, the sensitivity advantage of a long, thin, narrow film can be reduced by the reduction in its inherent signal to noise ratio which arises due to its increased resistance.

The following is an estimation of the signal-to-noise ratio of this thin film resistance thermometer. All resistors produce electrical noise as a result of the thermal motion of their electrons. The mean squared value of this thermal noise voltage is $\overline{V_t^2} = 4kTBR$; where k is the Boltzmann constant, T the resistor absolute temperature, B the bandwidth over which this (white) noise voltage is measured, and R is the resistance. A second contributor to the resistor noise arises when the resistor 'feels' the flow of an externally applied current. All electrical currents have inherent fluctuations, arising from the fact that change comes in discrete lumps (electrons). For a current of (average) magnitude I, the mean squared value of these fluctuations is $\overline{i_s^2} = 2eIB$, where e is the electron charge. Passing through a resistor, these fluctuations appear as a voltage noise $\overline{V_s^2} = \overline{i_s^2}R^2 = 2eVRB$, shot noise. Since these sources are uncorrelated, the total resistor noise may be expressed as, $$\overline{V_n^2} = \overline{V_t^2} + \overline{V_s^2} = (4kT + 2eV)RB. \quad \text{Eq. (38)}$$

Note that $\overline{V_n}^2$, a measure of the noise power, is proportional to the product of the observation bandwidth with the resistance (and implicitly with the gain of the film sensor).

The mean squared signal power (obtained from Eq. (37)) is, $$\overline{\delta V^2} = (\rho/t)\alpha^2 l^2 Q_E \delta T^2 \quad \text{Eq. (39)}$$

Forming the ratio of mean squared signal-to-noise powers yields the signal-to-noise ratio, $$S/N = \frac{\alpha^2 Q_E(lw)(\delta T)^2}{(4kT + 2e\sqrt{Q_E(\rho/t)}\ l)B} \quad \text{Eq. (40)}$$

where Eqs. (35) and (36) have been used for R and V in Eq. (38)

The film noise will result in an indicated RMS temperature fluctuation, $\delta T_n$ which may be found from Eq. (40) by setting $S/N = 1$, $$\delta T_n = \delta T|_{S/N=1} = \left\{ \frac{4kTB}{Q_E lw\alpha^2} \left[1 + \frac{e\sqrt{Q_E(\rho/t)}\ l}{2kT}\right] \right\}^{\frac{1}{2}} \quad \text{Eq. (41)}$$

For the nominal operating conditions of the sensors designed here, this temperature is equal to 0.002° K., quite negligible. A more rigorous optimization of film design would include all the tradeoffs between the film, amplifier, and data acquisition system. This was not done in this case since this gauge noise level is less than the 0.08° K. peak-to-peak equivalent noise of the amplification system used.

Refer now to FIGS. 6a–e for the fabrication and mounting of gauge configurations 10. Given the guidelines implicit in the gauge theory, the gauge configuration 10 design consisted of selection of the substrate 16 material, the serpentine pattern film resistor 30 material, and the sensor 12 and 14 geometry. All three must be compatible with the fabrication technique selected. Vapor deposition and photolithography were chosen as being compatible with both large scale, low cost fabrication of these gauges 10 and the fine sensor structure implied by the relatively high film sensor resistance desired.

Over fifty materials were studied as candidates for the gauge substrate 16. Polyimide (Kapton) was by far the most attractive material. It has the lowest $\sqrt{\rho c k}$ of any material studied (and thus the highest sensitvity bandwidth product), has excellent thermal and mechanical properties up to 600° K., has a well-developed adhesive technology (due to its wide use in strain gauges), is widely available, and is used in vapor deposition applications for spacecraft. The substrate 16 thickness, d, was selected as 25 μm to yield a direct mode response upper limit of 20 Hz and a semi-infinite mode lower limit of 1500 Hz.

The resistance temperature sensor serpentine patterns 30 are fabricated from 0.13 μm thick pure nickel. Nickel was chosen because of its relatively high net sensitivity and because of its very good adhesion characteristic in thin film applications. Platinum and titanium were also found to be suitable materials. The sensor 12 geometry selected was a square serpentine pattern to maximize the sensor length in an area compatible with the expected disturbance length in the flow field and thus maximize the signal-to-noise ratio as discussed earlier. The serpentine pattern results in a negligible heat flux when the resistance temperature sensor serpentine patterns 30 are measured. The sensor resistance is approximately 500Ω. Low resistance gold leads or 'tags' 32 that are 1 μm thick are deposited from the sensor to the edge of the polyimide sheet material 16. Signals from the bottom sensor 14 come through 0.5 mm diameter 'plated through' holes 34, laser drilled in the substrate 16 before the deposition process. Twenty-six gauge configurations 10 are fabricated on a single polyimide sheet material 16 whose dimensions are compatible with a turbine airfoil surface area.

The vapor deposition is done by DC sputtering at a pressure of $5 \times 10^{-4}$ torr of argon. The deposition rate of the nickel is 0.2 nm per second. The geometrical delineation is done using a liftoff process, the two gauge configuration 10 sides being done separately. The manufacturing yield and material properties are very strongly process variable dependent.

Originally, a silicon dioxide overcoat was applied to the bottom sensor 14 surface to serve as an electrical insulator. This was discontinued in favor of anodizing the surface of the aluminum blading, a practice which has proven completely satisfactory.

The polyimide material 16 are simply cut to conform to the blade surface outline and then bonded to the surface using conventional strain gauge cement and mounting techniques. Thermal time response testing has indicated that the glue layer is 5 μm thick. Seventy-five micron diameter wires (not shown) are soldered to the far ends of the gold tags to bring out the signals through slip rings (not shown) in a region far removed from the measurement area.

The following is a description of the calibration of the heat flux gauges. As in most experimental techniques used to determine heat flux, temperature is the physical quantity measured, from which surface heat flux is inferred by one of the several techniques: direct processing of the temperature signal by a physical RC analog network, numerical integration of the measurement with a kernal function, or processing of the measurement of a numerical analog of the gauge configuration 10 heat flow. These techniques are based upon a model of the heat conduction process within both the gauge configuration 10 and, in most cases, the test article. The model not only provides the physical and mathematical framework for each approach but also the form of the fundamental parameters which govern the behavior of the gauge.

The multilayer gauge configuration 10 provides two temperature measurements: at the surface, and at the depth d below the surface. From the model shown in FIG. 2 derived earlier, it can be seen that two constants must be determined — $\sqrt{\rho c k}$ (the conventional parameter used with surface thermometry based upon the semi-infinite assumption), and k/d (representing the steady state heat flux per unit temperature drop across the gauge configuration 10).

Careful calibration of these parameters is particularly important for this gauge since there is far less experience with polyimide as a substrate than with the more conventional quartz, Pyrex, or machinable ceramic materials. Significant deviations from the 'nominal' or advertised thermal and physical properties might occur within the manufacturing tolerances of the polyimide sheet 16. Furthermore, it is not yet known what influence, if any, the film thermometer deposition process might have upon these properties. Thus, given that the upper and lower film sensors 12 and 14 have been calibrated as thermometers and that all the assumptions pertaining to the sensor model are satisfied, knowledge of $\sqrt{\rho c k}$ and (k/d) will fully characterize the operation of the heat flux sensor 10.

The temperature coefficient of resistivity of the thin film temperature sensors 12 and 14 is conventionally calibrated by placing the gauge configurations 10 in a heated immersion bath and varying the bath temperature. All sensors on a test specimen are tested together. The accuracy of the calibration is limited by that of the reference thermometer to approximately 0.05° C.

Many calibration schemes for $\sqrt{\rho c k}$ and k/d place boundary conditions on the gauge configuration 10 for which exact solutions of the heat conduction equation can be found. The calibration coefficients may then be inferred from a simple comparison of the experimental data with the theoretical solution. The overall accuracy of the result will be dependent upon both the quality of the various physical measurements required and the accuracy to which the assumed boundary conditions are realized. This latter condition is especially crucial since its validity may not necessarily be apparent from the test data alone. Thus, there is a practical virtue in making these boundary conditions as simple as possible, i.e., that the flow of heat be one-dimensional and that the gauge 10 appear thermally semi-infinite. Given these conditions, simple analytical solutions can be found for the surface temperature response to a wide variety of surface hear flux time histories. For example, the top surface response to a step in surface heat flux, Q, is given by, $$T(t) = \frac{2Q}{\sqrt{\pi} \sqrt{\rho c k}} t^{\frac{1}{2}} \qquad \text{Eq. (42)}$$

Commonly, the step in surface heat flux is applied by pulsing current through the film, i.e., resistive dissipation in the sensor itself. This technique cannot be used with this gauge 10 geometry, however, since the temperature sensor 12 or 14 width is on the order of the insulator thickness, violating the uniform heating assumption and introducing errors on the order of 100%. Instead, a calibration technique is used in which the gauge 10 is radiantly heated by a laser pulse, simultaneously yielding $\sqrt{\rho c k}$ and k/d.

Conceptually, step radiant heating can be used as a direct calibration, i.e., a known heat rate is applied to the top sensor 12 with $\sqrt{\rho c k}$ being inferred from the top sensor 12 rise time and k/d simply computed from the top 12 and bottom 14 sensor temperatures. In practice, this can be difficult to achieve since the measurement accuracy is directly proportional to the absolute accuracy to which the pulse power is known, dependent upon absorption characteristics of the surface, and is sensitive to the energy distribution in the laser beam. Rather than attempt to perform an accurate absolute measurement, a relative calibration technique was developed which depends upon ratios, not absolute values.

In the relative calibration, the step response is measure with the sensor both covered and uncovered by a reference fluid of known $\sqrt{\rho c k}$. The method is based upon the principle that the applied surface coating acts as a sheet source of heat at the interface of two semi-infinite substances. Theory shows that the ratio of heat entering each substance equals the ratio of their respective values of $\sqrt{\rho c k}$ (since both materials see the same interface temperature), and this fact may be exploited to measure this ratio. Since the method involves comparison of measurements, absolute knowledge of the incident heat flux and film thermometer scale factor are not needed, being replaced instead only with the requirement that these quantities remain stable over the duration of the tests. However, any change in the total heat flux absorbed by the surface coating as a result of the application of the reference fluid (by mechanisms such as meniscus focusing, absorption by the fluid or by reflections from its surface) must either be negligible or quantifiable.

For the first set of tests, the sensor is placed in vacuum or still air. If $Q_I$ represents the surface heating, the resulting temperature rise according to the theory is, $$T_I(t) = \frac{2Q_I}{\sqrt{\pi} \sqrt{(\rho c k)_s}} t^{\frac{1}{2}} \qquad \text{Eq. (43)}$$

For the second set of tests, the sensor is placed in good thermal contact with a material of known $\sqrt{\rho c k}$ by covering it with a fluid of high electrical resistivity. If $Q_S$ represents the heat flux entering the sensor, and $Q_F$ that entering the fluid, than at their common boundary the temperature rise is given by, $$T_{II}(t) = \begin{cases} \dfrac{2Q_S}{\sqrt{\pi} \sqrt{(\rho c k)_S}} t^{\frac{1}{2}} \\ \dfrac{2Q_F}{\sqrt{\pi} \sqrt{(\rho c k)_F}} t^{\frac{1}{2}} \end{cases} \qquad \text{Eq. (44)}$$

from which it can be concluded that, $$\frac{Q_S}{Q_F} = \frac{\sqrt{(\rho c k)_S}}{\sqrt{(\rho c k)_F}} \qquad \text{Eq. (45)}$$

If the total heat flux absorbed by the coating for this second series of tests is $Q_{II}$, where $Q_{II} = Q_S + Q_F$, the flux into the sensor is found to be, $$Q_S = \left[ 1 + \frac{\sqrt{(\rho c k)_F}}{\sqrt{(\rho c k)_S}} \right]^{-1} Q_{II} \qquad \text{Eq. (46)}$$

and the temperature rise at the surface is therefore, $$T_{II}(t) = \left[ 1 + \frac{\sqrt{(\rho c k)_F}}{\sqrt{(\rho c k)_S}} \right]^{-1} \frac{2Q_{II}}{\sqrt{\pi} \sqrt{(\rho c k)_S}} t^{\frac{1}{2}} \qquad \text{Eq. (47)}$$

If $m_I$ and $m_{II}$ are the slopes of the linear region of sensor temperature, T, versus the square root of time (i.e., from Eqs. (43) and (47)) for the two conditions, then $$m_I = \frac{2Q_I}{\sqrt{\pi}\sqrt{(\rho ck)_S}} \quad \text{Eq. (48)}$$

$$m_{II} = \left[1 + \frac{\sqrt{(\rho ck)_F}}{\sqrt{(\rho ck)_S}}\right]^{-1} \frac{2Q_{II}}{\sqrt{\pi}\sqrt{(\rho ck)_S}} \quad \text{Eq. (49)}$$

and by forming their ratio, $$\sqrt{(\rho ck)_S} = \left[\left(\frac{Q_{II}}{Q_I}\right)\left(\frac{m_I}{m_{II}}\right) - 1\right]^{-1}\sqrt{(\rho ck)_F} \quad \text{Eq. (50)}$$

If the total heat absorbed by the coating is the same in both tests (as has been verified in this case), this relation becomes.

$$\sqrt{(\rho ck)_S} = \left[\left(\frac{m_I}{m_{II}}\right) - 1\right]^{-1}\sqrt{(\rho ck)_F} \quad \text{Eq. (51)}$$

and serves as the basic relative calibration formula. Note that only ratios of the quantities appear.

A simultaneous calibration of k/d may be obtained by extending the heating time to values very much larger than the characteristic time of the sensor, $\gamma = d^2/4\kappa$. The lower sensor begins to respond to the surface heating at approximately time $\gamma$ ($\gamma = 1.6$ ms for these gauges 10), with steady state conditions being achieved by $t = 20\gamma$. For $t > 20\gamma$, the steady state temperature difference, $(T_u - T_l)_{ss}$, between the upper and lower surfaces of the sensor becomes proportional to the applied heat flux, thus k/d may be found from, $$\frac{k}{d} = \frac{Q}{(T_u - T_l)_{ss}} \quad \text{Eq. (52)}$$

Given that Q is known.

The magnitude of Q could be obtained from an independent measurement of beam intensity and surface absorptivity (as would be required for an absolute calibration). However, when the k/d calibration is merged with the relative procedure, Q may be calculated directly by combining the initial step response data from the first set of tests, Eq. (48), with the value of $\sqrt{(\rho ck)_s}$ determined from the reference fluid tests, Eq. (51). Substituting this result into Eq. (52) then yields the desired expression for k/d), $$\frac{k}{d} = \left(\frac{\sqrt{\pi}}{2}\right)\left(\frac{m_I m_{II}}{m_I - m_{II}}\right)\frac{\sqrt{(\rho ck)_F}}{(T_u - T_l)_{ss}} \quad \text{Eq. (53)}$$

It should be pointed out that, unlike the $\sqrt{\rho ck}$ testing, this expression requires that the film thermometer temperature coefficients of resistivity be calibrated or, more precisely, that their scale factors, if unknown, at least be equal.

An argon ion laser was used as the radiant heat source, providing an incident flux of approximately 30 kW/m² over an area slightly larger than the 1 mm square of the film thermometer. The laser output was modulated by an electro-optic modulator producing a light step with a 25 ns rise time. The surface of the sensor was blackened with a Staedtler Lumograph Model-316 non-permanent marking pen, commonly used for view-graph presentations. The coating has good opacity and low thermal inertia, as verified by comparing the measured temperature responses with the parametric theory presented earlier, and its selection was the result of a large number of empirical tests. This coating has the advantage, unlike many of the other coating materials evaluated, of possessing both high electrical resistivity and poor solubility in the reference fluids.

The reference fluid chosen was dibutylphthalate, a commonly used heating bath medium with electrical equipment, because of its inert properties and high electrical resistivity. Its thermal properties were obtained from the manufacturer and checked against the properties of the more commonly employed glycerol using the electrical heating technique on a platinum-quartz film sensor. Its value of $\sqrt{\rho ck}$ is estimated to be 495 ±5%. Since it is much less viscous than glycerol, it does not produce measurable beam focusing effects, as did the latter fluid.

Figure 7:
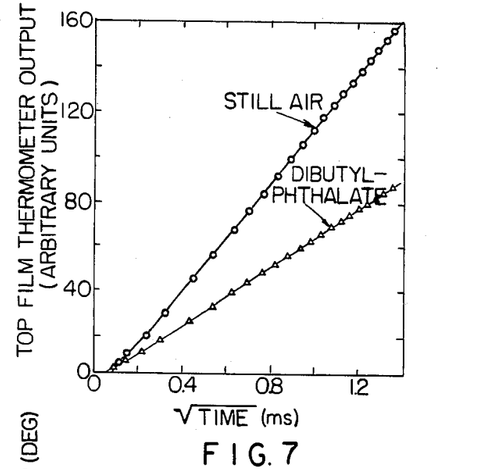
FIG. 7 shows the gauge thermal calibration data, $\sqrt{\rho c k}$, in proportional to the difference in slope of the curves.

A sample calibration is shown in FIG. 7, from which it can be seen that the top sensor 12 is linear with the square root of time. The slopes m are then calculated from the least square fits to the data as illustrated by the lines. From these measurements, we conclude that $\sqrt{\rho ck}$ for this gauge 10 is 575(W/m²)($\sqrt{sec}$)/°K. and k/d is 8086 W/(M²°K). This represents a 20% variations from nominal published data.

Since the gauge configurations 10 are intended for a highly stressed rotor environment, gauge sensitivity to strain must be considered. This was evaluated by pulling an aluminum specimen bearing a gauge sensor in a tensile test machine. Strain sensitivity proved to be negligible, equivalent to 0.003° C. at 2% strain.

The heat flux gauge configurations 10 have been shown to be suitable for evaluation of the surface flux to turbine blading at low and high frequencies when the gauge characteristics can be simply defined. At low frequencies, the heat flux can be evaluated directly from the measured temperature difference across the insulator, and at high frequencies through the use of semi-infinite procedures. The numerical technique described here of reducing the two temperature histories to heat flux expands the frequency range of the gauges to include the regime between DC and semi-infinite response.

As with most numerical techniques, discretization of the governing equations is required, including distribution of calculational stations for nodes through the insulator. In order to provide accurate prediction of the surface heat transfer rate, the distribution of the calculation nodes must be such as to accurately capture the varying temperature field in the insulator.

The governing heat conduction equation is:

$$\frac{\partial^2 T}{\partial x^2} = (\rho c/k)\frac{\partial T}{\partial t} \quad \text{Eq. (54)}$$

For low frequency heat transfer rate variations, the time derivative in the above equation approaches zero, and thus a constant temperature gradient is expected acros the insulator. Since this is a linear solution, the exact placement of nodes in the substrate is not crucial.

As the excitation frequency increases, however, the upper surface temperature signal is attenuated through the insulator until, at very high frequencies, the insulator appears semi-infinite. The expected temperature solution will be:

$$T = Ae^{-Kx}\cos(\omega t - Kx) \text{ where } K = \sqrt{(0.5\ \omega\rho c/k)} \quad \text{Eq. (55)}$$

or $$|T| = Ae^{-Kx} \quad \text{Eq. (56)}$$

Thus, the magnitude of T decays exponentially through the insulator and a logarithmic spacing can be used to capture the temperature profile efficiently in the numerical scheme. The numerical technique utilizes a lumped network of discrete elements of logarithmically varying thermal conductivity and thermal capacity to calculate the surface heat transfer rates. The increasing thermal impedance of each element of the network corresponds to placing the temperature nodes at logarithmically increasing distance into the substrate.

The heat conduction equation is descretized in finite-difference form (for non-uniform node spacing) as:

$$\frac{1}{\kappa}\frac{dT_i}{dt} = \frac{T_{i-1}}{\Delta x_i \cdot \Delta x_i} - \frac{T_i}{\Delta x_i}\left(\frac{1}{\Delta x_i} + \frac{1}{\Delta x_{i+1}}\right) + \frac{T_{i+1}}{\Delta x_i \Delta x_{i+1}} \quad \text{Eq. (57)}$$

where the node number i ranges from 1 to the number of sections N.

The solution of this lumped network equation is an extension of the work published by Oldfield et al for the design of high frequency lumped RC networks for the analog evaluation of heat transfer rates to semi-infinite substrates. Oldfield et al work was concerned with the simulation of the semi-infinite heat conduction process, thus is not directly applicable to the finite thickness heat flux gauges described in this paper. The finite thickness heat flux gauge was accounted for by adding an extra thermal resistance at the end of the lumped network, thereby transforming it from a semi-infinite to a finite length line.

Equation (57) can be written in matrix form (simulating a finite length line) as:

$$\frac{1}{\kappa}\frac{dT}{dt} = AT + \frac{T_u(t)}{\Delta x_1 \Delta x_1} + \frac{T_l(t)}{\Delta x_N \Delta x_{N+1}} \quad \text{Eq. (58)}$$

The finite length line now requires two inputs, the temperature of the upper surface, $T_u$, of the insulator and the lower surface, $T_l$. The resulting set of coupled equations is solved by a fourth order Runge-Kutta method to generate the upper surface heat flux rate from the calculated temperature drop across the first element of the network.

The selection of the thermal impedance of each of the elements is set to satisfy the following conditions:

(1) the finite thickness of the insulator must be mirrored in the total thermal impedance of the network;

(2) $\rho ck$ for each element must equal the physical value;

(3) the thermal impedance of the first element is set by the required network bandwidth; and (4) the number of nodes required in the insulator sets the logarithmic spacing of all but the first element.

The accuracy of such a lumped network simulation can be established by back-calculating the incident heat transfer rate for exact analytical upper and lower temperature solutions in specific cases. Two cases were studied: a step change in heat flux, and a sinusoidal heat flux variation.

Figure 8:
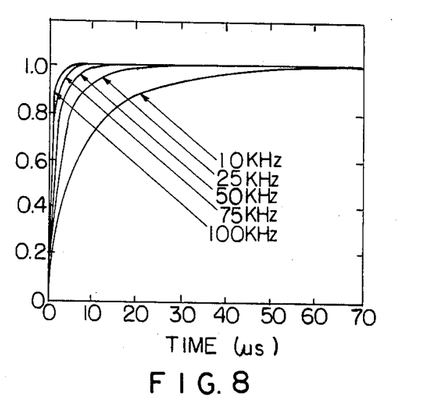
FIG. 8 shows the rise time of the numerical data reduction model as a function of model bandwidth.

FIG. 8 shows the normalized heat transfer rate variation calculated using exact upper and lower surface temperature solutions for a step change in heat transfer rate applied to a gauge glued to an aluminum substrate. The calculated response is shown for five network upper frequency limits, all with nine stages used to discretize the temperature field.

Figure 9:
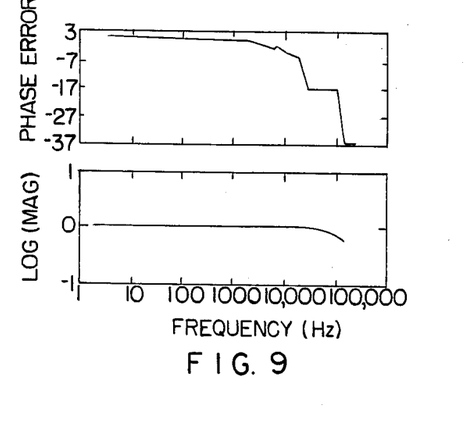
FIGS. 9a and 9b shows the frequency response of 100 kHz bandwidth data reduction numerical scheme.

FIG. 9 shows the frequency response of a 100 kHz bandwidth network with nine stages. The input temperatures were exact solutions to the heat conduction equation for a sinusoidal heat flux variation on a gauge configuration glued to an aluminum substrate. The magnitude and phase data presented in this figure is therefore relative to the driving heat flux rate variation. The agreement between the exact and numerical methods is within 0.3% over the 5 to 2000 Hz band which is difficult to recover otherwise.

Figure 10:
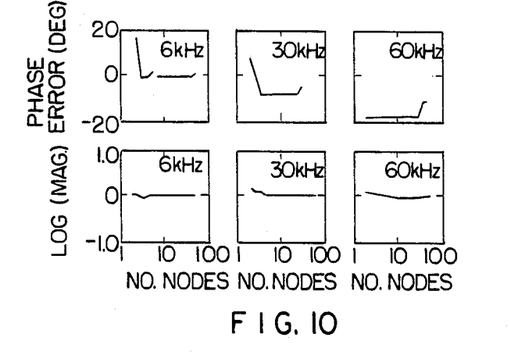
FIGS. 10a–f show the data reduction scheme response as a function of the number of calculation nodes.

The effect of changing the number of elements used in the network on the error in reconstructing a sinusoidal heat transfer rate for a nominal 100 kHz bandwidth is whown in FIG. 10. It can be seen that the errors are relatively insensitive to the number of stages chosen for the network, and are more closely tied in with the specification of the thermal impedance of the first element in the network.

Figure 11:
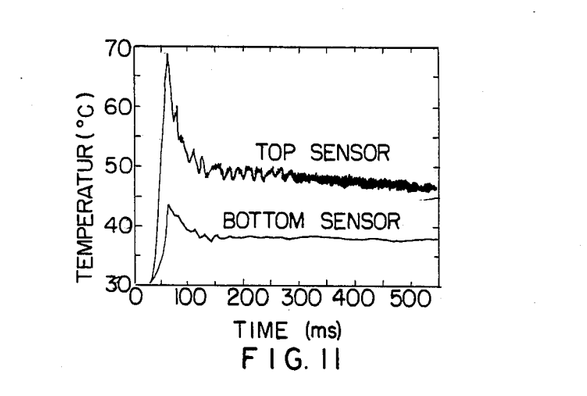
FIG. 11 shows the time history of gauge sensors mounted on the stationary casing above a transonic turbine rotor tip.

As an initial test of the gauge technology, the heat flux gauges were mounted on the stationary outer tip casing above the rotor of a transonic turbine in the MIT Blowdown Turbine Facility. A time history of the top and bottom temperature sensors of a gauge is shown in FIG. 11. At time equal to zero, the tunnel is in vacuum and the sensors are the same temperature. After the starting transient, the tunnel operation is then quasi-steady (from 250 ms). The metal substrate temperature remains constant while the inlet temperature slowly drops, reflecting the isentropic expansion from the supply tank. This is seen in the decrease in the top-bottom temperature difference and thus in heat flux over the test time. The thick line of the top sensor output is the envelope of the high frequency heat flux components.

Figure 12:
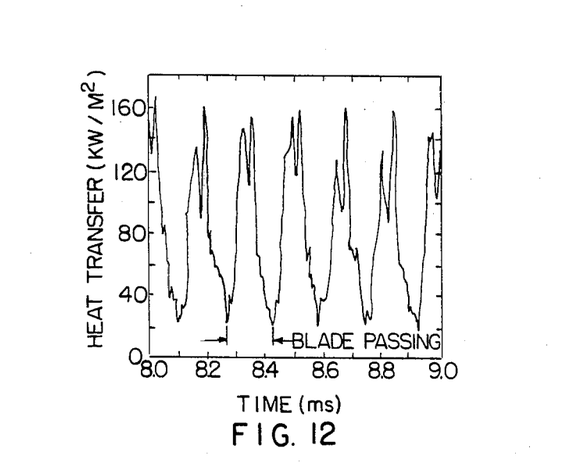
FIG. 12 shows the heat flux calculated from the data in FIG. 11 starting at 300 ms.

The heat flux, as calculated by the numerical data reduction technique from these two signals starting at 300 ms, as shown in FIG. 12. The blade passing frequency is approximately 6 kHz and the sampling frequency is 200 kHz. Note that the relatively small amplitude of the high frequency temperature fluctuation on the top sensor in FIG. 11 actually represents an AC heat flux modulation of 80%. The small AC temperature signal relative to the DC reflects the $\omega^{\frac{1}{2}}$ rolloff in sensitivity discussed in the gauge theory.

The heat flux time variation on the tip casing was quite periodic with blade passing. This facilitated construction of a contour plot of the casing heat flux distribution from a line of gauges arranged over the blade chord. Overall, a very high level of both means and time varying heat flux were seen with the peak levels on the order of that at nozzle guide vane leading edge.

A multilayer heat flux gauge configuration 10 has been developed which successfully meets all of its design criteria. It is directly applicable to metal blading in large numbers, has frequency response extending from DC to 100 kHz, does not introduce flow disturbance, and is well suited to rotating frame applications. These gauges are now being extensively used in the turbine research program at MIT.

It will be understood that various changes in details, materials, steps and arrangement of parts, which have been herein described and illustrated in order to explain the nature of the invention, may be made by those skilled in the art within the principle and scope of the invention as expressed in the appended claims.

What is claimed is:

1. A heat flux multilayered gauge configuration for measuring a heat flux on an aircraft comprising:
    a first serpentine pattern resistance temperature sensor;
    a second serpentine pattern resistance temperature sensor;
    a polyimide substrate located intermediate said first resistance temperature sensor and said second temperature sensor and bonded thereto, and said substrate further located on said aircraft blade such that the heat flux to be measured flows through said substrate, said substrate including a pair of apertures;
    a first pair of leading extending from an edge of said substrate to respective ends of said first resistance temperature sensor; and
    a second pair of leads extending from an edge of said substrate through respective members of said substrate apertures to respective ends of said second resistance temperature sensor.

2. A heat flux gauge configuration according to claim 1 wherein said first serpentine pattern resistance temperature sensor and said second serpentine pattern resistance temperature sensor are comprised of nickel material and said substrate is comprised of said polyimide.

3. A heat flux gauge configuration according to claim 1 wherein said first serpentine pattern resistance temperature sensor and said second serpentine pattern resistance temperature sensor are comprised of platinum material and said substrate is comprised of said polyimide.

4. A heat flux gauge configuration according to claim 1 wherein said first serpentine pattern resistance temperature sensor and said second serpentine pattern resistance temperature sensor are comprised of titanium material and said substrate is comprised of said polyimide.

5. A plurality of heat flux gauge configurations for measuring a heat flux on an aircraft blade comprising:
    a plurality of spaced first serpentine pattern resistance temperature sensors;
    a plurality of spaced second serpentine pattern resistance temperature sensors;
    a polyimide substrate located such that the heat flux to be measured flows through said substrate and said substrate further located intermediate said first and second resistance temperature sensors, said substrate including a plurality of pairs of apertures;
    said plurality of first resistance temperature sensors, said plurality of second resistance temperature sensors and said plurality of pairs of apertures all being equal in number and each having respective members aligned with each other for forming a plurality of heat flux gauge configurations;
    a plurality of first pairs of leads extending from an edge of said substrate to respective ends of said first resistance temperature sensors; and
    a plurality of second pairs of leads extending from an edge of said substrate through respective members of said pair of substrate apertures in respective ends of said second resistance temperature sensors.

6. A plurality of heat flux gauge configurations according to claim 5 wherein said plurality of spaced first serpentine pattern resistance temperature sensors and said plurality of spaced second serpentine pattern resistance temperature sensors are each comprised of nickel material and said substrate is comprised of said polyimide.

* * * * *